United States Patent
Luo

(10) Patent No.: US 12,099,711 B2
(45) Date of Patent: Sep. 24, 2024

(54) VIDEO PICTURE DISPLAY ADJUSTMENT METHOD AND APPARATUS, DEVICE, MEDIUM, AND PROGRAM PRODUCT

(71) Applicant: Tencent Technology (Shenzhen) Company Limited, Shenzhen (CN)

(72) Inventor: Qiqi Luo, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/985,786

(22) Filed: Nov. 11, 2022

(65) Prior Publication Data

US 2023/0071445 A1    Mar. 9, 2023

Related U.S. Application Data

(63) Continuation of application No. PCT/CN2022/077715, filed on Feb. 24, 2022.

(30) Foreign Application Priority Data

Mar. 1, 2021   (CN) .................. 202110227788.X

(51) Int. Cl.
G06F 3/0485   (2022.01)
G06F 3/04845  (2022.01)

(52) U.S. Cl.
CPC ........ *G06F 3/0485* (2013.01); *G06F 3/04845* (2013.01)

(58) Field of Classification Search
CPC .............. G06F 3/0485; G06F 3/04845; H04N 21/47217
See application file for complete search history.

(56) References Cited

U.S. PATENT DOCUMENTS 8,347,232 B1 *  1/2013  Prud'Hommeaux ........................ G06F 3/04847
                                                    715/833
2006/0288392 A1 * 12/2006  Fleming ................. H04N 5/765
                                                    725/86

(Continued)

FOREIGN PATENT DOCUMENTS

CN    103986962 A    8/2014
CN    104735544 A    6/2015

(Continued)

OTHER PUBLICATIONS

Tencent Technology, WO, PCT/CN2022/077715, May 13, 2022, 5 pgs.

(Continued)

*Primary Examiner* — Nicholas Klicos
(74) *Attorney, Agent, or Firm* — Morgan, Lewis & Bockius LLP

(57) ABSTRACT

A video frame display method includes: displaying a video playback area in a scrollable area, the video playback area being configured to display a target video; in response to detecting a drag operation on the scrollable area, moving the video playback area along a drag direction of the drag operation; and displaying a video frame of the target video at a target video progress in the video playback area corresponding to a position of the video playback area on the scrollable area, the position being associated with the target video progress of the target video.

19 Claims, 9 Drawing Sheets

(56) References Cited

U.S. PATENT DOCUMENTS

| | | | |
|---|---|---|---|
| 2009/0036105 A1* | 2/2009 | Carion | G06F 9/451 |
| | | | 455/566 |
| 2010/0043028 A1* | 2/2010 | Cormican | H04N 21/4348 |
| | | | 725/52 |
| 2010/0231534 A1* | 9/2010 | Chaudhri | G11B 27/105 |
| | | | 345/173 |
| 2011/0090255 A1* | 4/2011 | Wilson | G06F 3/04883 |
| | | | 345/647 |
| 2013/0191776 A1* | 7/2013 | Harris | H04M 1/72445 |
| | | | 715/784 |
| 2013/0307792 A1* | 11/2013 | Andres | G06F 3/04847 |
| | | | 345/173 |
| 2014/0215413 A1* | 7/2014 | Calkins | G06F 3/0483 |
| | | | 715/863 |
| 2014/0310601 A1* | 10/2014 | Matejka | H04N 21/8153 |
| | | | 715/720 |
| 2015/0100885 A1* | 4/2015 | Riley | G06F 3/04883 |
| | | | 715/720 |
| 2015/0177933 A1* | 6/2015 | Cueto | G06F 3/0485 |
| | | | 715/776 |
| 2015/0205474 A1* | 7/2015 | Donelan | G06F 3/0485 |
| | | | 715/251 |
| 2015/0370402 A1* | 12/2015 | Checkley | G06F 3/0487 |
| | | | 345/173 |
| 2016/0364097 A1* | 12/2016 | Wheeler | G06F 16/743 |
| 2016/0370982 A1* | 12/2016 | Penha | G06F 16/745 |
| 2017/0024098 A1* | 1/2017 | Doherty | G11B 27/11 |
| 2017/0164051 A1 | 6/2017 | Hn | |
| 2017/0169856 A1* | 6/2017 | Wang | G06F 16/7867 |
| 2017/0329484 A1* | 11/2017 | Huang | G06F 3/0488 |
| 2019/0028768 A1* | 1/2019 | Zhou | H04N 21/488 |
| 2019/0130943 A1* | 5/2019 | Kauffmann | G11B 27/031 |
| 2020/0304880 A1* | 9/2020 | Diaz Delgado | G06F 9/451 |
| 2020/0351564 A1* | 11/2020 | Zhang | H04N 21/6587 |

FOREIGN PATENT DOCUMENTS

| | | |
|---|---|---|
| CN | 105898523 A | 8/2016 |
| CN | 105898610 A | 8/2016 |
| CN | 106534734 A | 3/2017 |
| CN | 107241657 A | 10/2017 |
| CN | 108965980 A | 12/2018 |
| CN | 110679154 A | 1/2020 |
| CN | 111970257 A | 11/2020 |
| WO | WO 2016074120 A1 | 5/2016 |
| WO | WO 2018126899 A1 | 7/2018 |

OTHER PUBLICATIONS

Tencent Technology, IPRP, PCT/CN2022/077715, Aug. 29, 2023, 6 pgs.

Tencent Technology, ISR, PCT/CN2022/077715, May 13, 2022, 2 pgs.

* cited by examiner

VIDEO PICTURE DISPLAY ADJUSTMENT METHOD AND APPARATUS, DEVICE, MEDIUM, AND PROGRAM PRODUCT

CROSS-REFERENCE TO RELATED APPLICATIONS

This application is a continuation application of PCT Patent Application No. PCT/CN2022/077715, entitled "VIDEO DISPLAY METHOD, DEVICE, DEVICE, MEDIUM AND PROGRAM PRODUCTS" filed on Feb. 24, 2022, which claims priority to Chinese Patent Application No. 202110227788.X, filed with the State Intellectual Property Office of the People's Republic of China on Mar. 1, 2021, and entitled "VIDEO PICTURE DISPLAY METHOD AND APPARATUS, DEVICE, MEDIUM, AND PROGRAM PRODUCT", all of which are incorporated herein by reference in their entirety.

FIELD OF THE TECHNOLOGY

Embodiments of this application relate to the field of man-machine interaction, and in particular, to a video frame display method and apparatus, a device, a medium, and a program product.

BACKGROUND OF THE DISCLOSURE

Information flow is a display mode longitudinally arranged like a waterfall and new content continuously appears as a user swipes up and down. In addition to a longitudinal sliding function, the information flow further provides a lateral sliding function.

In the related art, a mobile terminal displays a user interface, and the user interface includes a longitudinally arranged information flow, and there is at least one video player in the information flow. When the user longitudinally slides on the user interface, the information flow is updated according to the longitudinal direction, and the video player longitudinally moves along with it. When the user triggers a playback control on the video player, the video player plays the video.

In the method in the related art, before the user triggers the video player, a display form of the video by the video player in the information flow is limited to a cover image of the video, and video content that can be displayed is single.

SUMMARY

Embodiments of this application provide a video frame display method and apparatus, a device, a medium, and a program product, which can present videos in an information flow in a new form. The technical solutions are as follows:

According to an aspect, a video frame display method is provided, the method including:
  displaying a video playback area in a scrollable area, the video playback area being configured to display a target video;
  in response to detecting a drag operation on the scrollable area, moving the video playback area along a drag direction of the drag; and
  displaying a video frame of the target video at a target vide progress in the video playback area corresponding to a position of the video playback area on the scrollable area, the position being associated with the target video progress of the target vide.

According to another aspect, a video frame display apparatus is provided, the apparatus including:
  a display module, configured to display a video playback area in a scrollable area, the video playback area being configured to display a target video; and
  an interaction module, configured to detect a drag operation on the scrollable area;
  the display module being configured to move, in response to detecting a drag operation on the scrollable area, the video playback area along a drag direction of the drag operation on the scrollable area; and
  the display module being configured to display a video frame of a target video progress in the target video on the video playback area following a position of the video playback area on the scrollable area, the position being associated with the target video progress of the target video.

According to another aspect, a computer device is provided, the computer device including a processor and a memory, the memory storing at least one instruction, at least one program, a code set, or an instruction set, the at least one instruction, the at least one program, the code set or the instruction set being loaded and executed by the processor to implement the video frame display method described in the foregoing aspect.

According to an aspect, a computer-readable storage medium is provided, the computer-readable storage medium storing at least one instruction, at least one program, a code set, or an instruction set, the at least one instruction, the at least one program, the code set, or the instruction set being loaded and executed by a processor to implement the video frame display method described in the foregoing aspect.

According to another aspect, the embodiments of this application provide a computer program product or a computer program, the computer program product or the computer program including computer instructions, the computer instructions being stored in a computer-readable storage medium. A processor of a computer device reads the computer instructions from the computer-readable storage medium, and executes the computer instructions, so that the computer device performs the video frame display method provided in the foregoing embodiments.

The technical solutions provided in the embodiments of this application include at least the following beneficial effects:

When a drag operation of dragging a page by the user is received, while scrolling the video playback area on the page according to the drag operation, the corresponding video frame is displayed on the video playback area according to the video progress indicated by a position where the video playback area has scrolled on the page. Therefore, an operation of scrolling and updating the page content by the user is associated with the frame displayed in the video playback area. The video frame is displayed according to the drag operation of the user. When the user scrolls the video playback area to different positions on the page, video frames of different video progress will be displayed on the video playback area, and the video frames will be displayed correspondingly according to the drag operation of the user. Furthermore, when the user scrolls the page content, the user is made to pay attention to the video playback area in the page, and the interaction and interest of the video content in the scrolling page are improved.

DESCRIPTION OF EMBODIMENTS

First, terms involved in the embodiments of this application are briefly introduced.

User Interface (UI) controls are visible or invisible controls or elements on a user interface of an application, such as pictures, input boxes, text boxes, buttons, labels, and the like. For example, when the UI controls are invisible controls, a user can trigger these invisible controls by triggering a designated area on the user interface. Some UI controls respond to user operations, such as a progress bar, which is configured to change a playback progress of a video. The UI controls involved in the embodiments of this application include but not limited to: a progress bar and a drag control.

The cloud technology is a hosting technology that unifies a series of resources such as hardware, software, and networks in a wide area network or a local area network to implement computing, storage, processing, and sharing of data.

A cloud technology is a collective name of a network technology, an information technology, an integration technology, a management platform technology, an application technology, and the like based on an application of a cloud computing business mode, and may form a resource pool. Usage is based on a requirement and is flexible and convenient. A cloud computing technology becomes an important support. A background service of a technical network system requires a large amount of computing and storage resources, such as a video website, an image website, and more portal websites. As the Internet industry is highly developed and applied, each article may have its own identifier in the future and needs to be transmitted to a background system for logical processing. Data at different levels is separately processed, and data in various industries requires strong system support and The information (including but not limited to user equipment information, user personal information, and the like), data (including but not limited to data for analysis, stored data, displayed data, and the like) and signals involved in this application are both authorized by the user or fully authorized by all parties, and the collection, use and processing of relevant data need to comply with relevant laws, regulations and standards of relevant countries and regions. For example, the video playback areas involved in this application are all obtained with full authorization.

Figure 1:
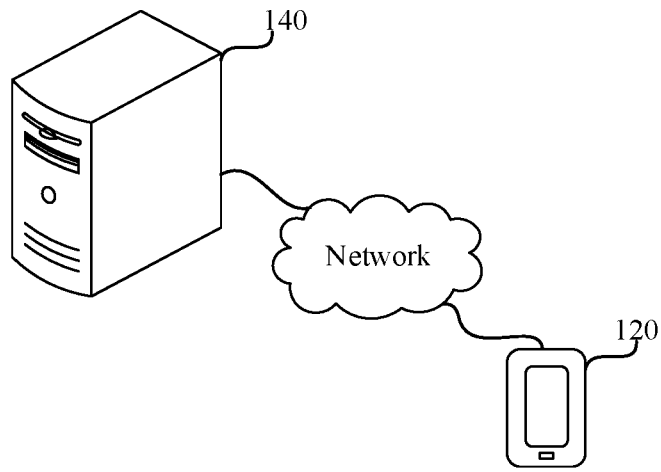
FIG. 1 is a structural block diagram of a computer system according to an exemplary embodiment of this application.

FIG. 1 shows a schematic diagram of a computer system according to an embodiment of this application. An implementation environment of the solution may be implemented as a system with a display function of video frames, for example, the system may include: a terminal 120 and a server 140.

The terminal 120 may be an electronic device such as a mobile phone, a tablet computer, a wearable device, and a personal computer (PC). An application that supports video presentation is installed and run on the terminal 120. The application may be any one of a browser application, a video player, a short video player, a news program, a knowledge program, a life program, an instant messaging program, a shopping program, a picture sharing program, and a community program. The terminal 120 is a terminal used by a user.

For example, a user interface displayed by a client has a scrollable area, and a video playback area is displayed on the scrollable area. When the user performs a drag operation to move the content within the scrollable area, the client follows a change of the position of the video playback area on the scrollable area, and displays a video frame corresponding to a video progress.

The terminal 120 is connected to the server 140 by using a wireless network or a wired network.

The server 140 includes at least one of one server, a plurality of servers, a cloud computing platform, and a virtualization center. For example, the server 140 includes a processor and a memory. The memory includes an access module and an information flow pushing module. The server 140 is configured to provide a background service to the application supporting video presentation. In some embodiments, the server 140 is responsible for primary computing work, and the terminal 120 is responsible for secondary computing work. Alternatively, the server 140 is in charge of secondary computing work, and the terminal 120 is in charge of primary computing work. Alternatively, a distributed computing architecture is adopted between the server 140 and the terminal 120 to perform collaborative computing.

The server 140 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data an artificial intelligence platform. The terminal may be a smartphone, a tablet computer, a notebook computer, a desktop computer, a smart speaker, a smart watch, or the like, but is not limited thereto. The terminal and the server may be directly or indirectly connected in a wired or wireless communication manner. This is not limited in this application.

A person skilled in the art may learn that there may be more or fewer terminals. For example, there may be only one terminal, or there may be dozens of or hundreds of terminals or more. The quantity and the device type of the terminals are not limited in the embodiments of this application.

With reference to the foregoing description of the implementation environment, a video frame display method provided in an embodiment of this application is described. For example, the method is performed by a client running on the terminal shown in FIG. 1. The client running on the terminal is a client of an application, and the application may be a browser application. For example, the video frame display method provided in this application may further be implemented through a web page, a mini program, a quick application, and the like.

Figure 2:
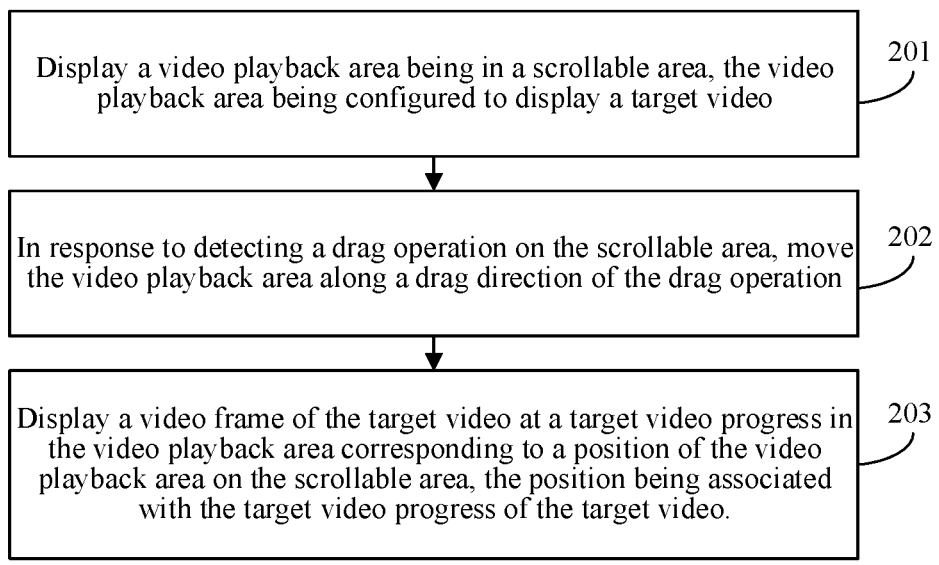
FIG. 2 is a method flowchart of a video frame display method according to another exemplary embodiment of this application.

FIG. 2 shows a flowchart of a video frame display method according to an exemplary embodiment of this application. The method may be performed by the client running on the foregoing terminal in FIG. 1, and the client is an application with a video display function. The method includes the following steps.

Step 201: Display a scrollable area, a video playback area being displayed on the scrollable area, and the video playback area being configured to display a target video.

The scrollable area means that the content within the area can change a display position in response to a drag operation of a user. For example, the scrollable area means that a displayed position of the content displayed within the area on the terminal can change with the drag operation of the user. For example, the scrollable area is displayed within a user interface of the client, and the scrollable area means that the position of the content displayed within the area in the user interface can change with the drag operation of the user. For example, changing the display position refers to: without changing a content layout in the scrollable area, moving all content in the scrollable area in one direction as a whole, the content originally displayed in the scrollable area may disappear from the area after being moved. In addition, new content enters the scrollable area.

For example, first content of the scrollable area is displayed at a first position of the user interface at a first moment, and when the scrollable area receives an upward drag operation by the user, the first content moves upward to a second position of the user interface.

For example, the scrollable area is an area on the user interface or a page of the client, and the area can update the display position of each content in the area according to the received drag operation. For example, an update of the display position is scrolling.

For example, the scrollable area may be an area configured to display information flow. The information flow includes a plurality of information flow content arranged according to an updated direction. In the scrollable area, the information flow content in the information flow may move forward according to the updated direction, or move backwards according to an opposite direction of the updated direction. For example, the information flow includes: at least one of a text, a picture, a video and an audio.

The content displayed in the scrollable area includes a video playback area. For example, when the scrollable area is configured to display the information flow, at least one information flow content in the information flow is a video playback area. The video playback area is configured to display a target video. In some embodiments, the video playback area is an independent video player, or an embedded video player, or a video playback plug-in.

For example, the video playback area includes a video display area that is configured to display the target video, and the video display area is configured to display a video frame of the target video. For example, the video playback area may further include an area for displaying a video title, a video publisher, a video release time, an avatar of the video publisher, and a nickname of the video publisher of the target video.

Figure 3:
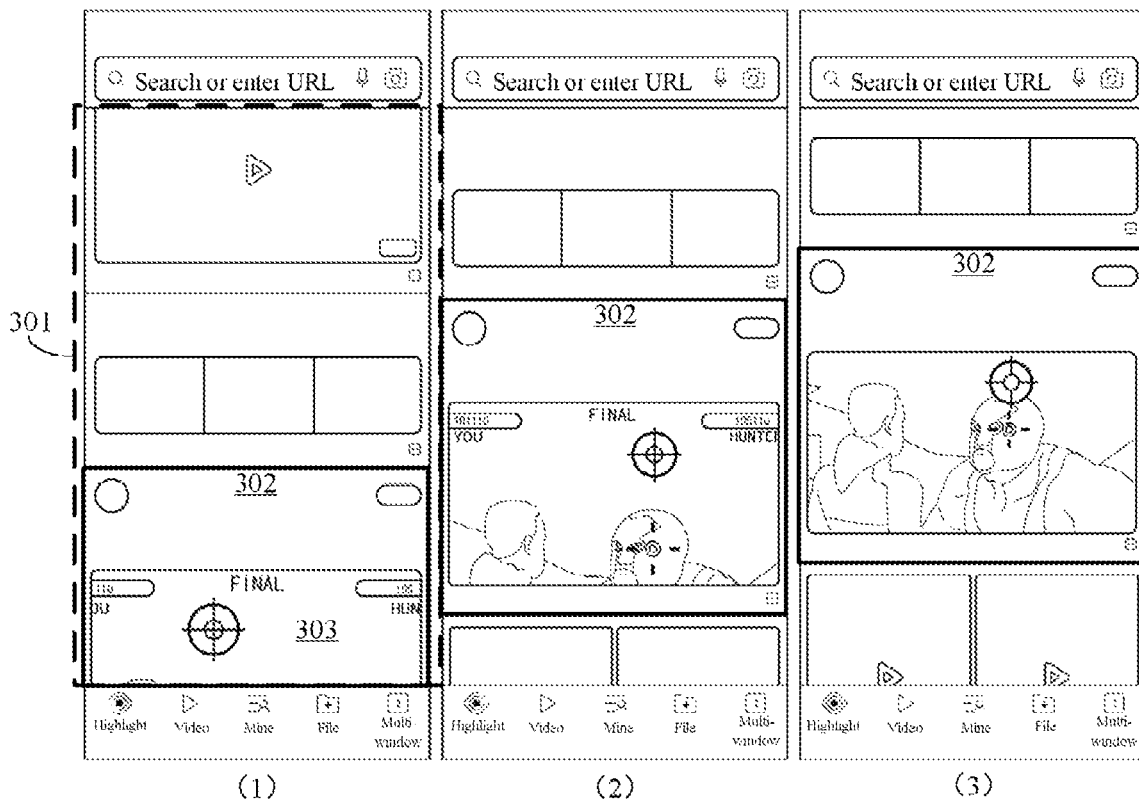
FIG. 3 is a schematic diagram of a user interface of a video frame display method according to another exemplary embodiment of this application.

For example, as shown in FIG. 3, a scrollable area 301 is displayed in the user interface of the client, a video playback area 302 is displayed in the scrollable area, and a video frame of a target video is displayed on the video playback area 302. As shown in FIG. 3 (1), (2) and (3), with an upward sliding drag operation of the user, the content within the scrollable area 301 moves upward as a whole. In FIG. 3 (1), with the upward sliding drag operation, only a part of the video playback area 302 is displayed in the scrollable area 301. In FIG. 3 (2), the video playback area 302 moves upward, and a complete video playback area 302 is displayed in the scrollable area 301. The user continues to slide up, and in FIG. 3 (3), the video playback area 302 continues to move upward.

Step 202: Move, in response to receiving a drag operation performed on the scrollable area, the video playback area along a drag direction of the drag operation on the scrollable area.

The drag operation acting on the scrollable area may be: a sliding operation performed by a user touch display screen received on the scrollable area; or an operation of the user clicking anywhere and dragging received on the scrollable area; or a drag operation received on a drag area corresponding to the scrollable area, for example, the operation of dragging the scroll bar received on a scroll bar corresponding to the scrollable area.

For example, the drag direction of the drag operation is one of effective operation directions of the scrollable area, and the effective operation directions refer to directions in which the scrollable area can be scrolled. For example, if the scrollable area can be scrolled upward or downward, the effective operation direction of the scrollable area is upward or downward, and the drag direction of the drag operation is one of upward or downward. The foregoing effective operation directions are merely examples, and the scrollable area can certainly be scrolled in any other direction, for example, leftward, rightward, upward 45°, and the like.

When the drag operation is a sliding operation on the touch display screen, a sliding direction of the user may have a certain deviation from the effective operation direction. In this case, the client will determine an effective operation direction that best matches an actual drag direction of the drag operation as the drag direction of the drag operation. For example, if the effective operation direction is upward or downward, an actual drag direction of the drag operation of the user is 40° obliquely upward. Since the actual drag direction is closest to the upward direction, the client determines the drag direction of the drag operation as upward.

For example, the drag operation acting on the scrollable area means that: the drag operation is configured to manipulate content within the scrollable area to scroll, and the drag operation may be an operation received on the scrollable area, or it may be an operation received outside the scrollable area. The content within the scrollable area includes a video playback area and other information flow content. The other information flow content includes: at least one of a text, an image, an animation, an audio and a special effect.

After receiving the drag operation, the client determines a corresponding drag direction according to the drag operation, and controls the video playback area to move in the drag direction in the scrollable area.

For example, when there is other content in the scrollable area except the video playback area, the other content may also move in the drag direction synchronously with the drag operation.

For example, as shown in FIG. 3, when the client receives a drag operation of dragging upward, as shown in FIG. 3 (1), (2), and (3), the video playback area 302 correspondingly moves upward.

Step 203: Display a video frame of the target video at a target video progress in the video playback area, corresponding to a position of the video playback area on the scrollable area, the position being associated with the target video progress of the target video.

For example, with the drag operation, the video playback area moves in the scrollable area, and the position of the video playback area will change. The position where the video playback area has moved in the scrollable area is called a position. The client will display a video frame corresponding to a video progress in the video playback area according to the position where the video playback area is.

The position has a correspondence to the video progress of the target video. For example, it may be understood that the position has a correspondence to a progress bar of the target video. That is, each position corresponds to a video progress, and a plurality of video progresses corresponding to a plurality of positions through which the video playback area passes constitute a target video progress. The client follows a movement of the video playback area within the scrollable area and correspondingly displays a video frame of the target video progress on the video playback area.

In this way, the video frame displayed on the video playback area can be bound to a scrolling page operation of the user. When the user moves the content on the scrollable area through the drag operation, the client displays the corresponding video frame according to the position the video playback area has moved, so that the video frame displayed in the video playback area is directly related to the drag direction of the drag operation of the user, the time and speed of each drag position, and the change of the drag direction and the speed of the drag (how fast the video playback area moves) will affect the video frame displayed on the video playback area.

For example, when a first position corresponds to a first video frame, a second position corresponds to a second video frame, and a third position corresponds to a third video frame, if the video playback area sequentially passes through the first position, the second position, and the third position according to the drag operation, the first video frame, the second video frame and the third video frame will be sequentially displayed on the video playback area, that is, the video frame of the target video being played forward is realized, and the length of time that the video playback area stays at the first position, the second position, and the third position will also affect the duration of each video frame displayed on the video playback area. If the video playback area sequentially passes through the third position, the second position and the first position according to the drag operation, the third video frame, the second video frame and the first video frame will sequentially be displayed on the video playback area, that is, the video frame of the target video being played backwards is realized.

For example, as shown in FIG. 3, when the client receives a drag operation of dragging upward, as shown in FIG. 3 (1), (2), and (3), the video playback area 302 correspondingly moves upward. In this case, the video frame displayed in the video playback area 302 also changes with the change of the position through which the video playback area passes when it moves upward.

For example, the position of the video playback area on the scrollable area may be determined by using any point on the video playback area as a reference point. For example, a center point of the video playback area may be used as a reference point, and the position of the center point of the video playback area on the scrollable area may be determined as a current position of the video playback area. In another example, a first pixel point (a pixel point in the first row/column) that appears on the scrollable area of the video playback area can be used as a reference point, and the position of the first pixel on the scrollable area can be determined as a current position of the video playback area.

For example, in the process of displaying the video frame of the target video progress in the target video, if the user is interested in the target video, the user can directly watch the target video. In some embodiments, the target video is played starting from the $i^{th}$ video frame of the $i^{th}$ video progress in response to satisfying a start playback condition; or the target video is replayed in response to satisfying the start playback condition. For example, the start playback condition is that the time to stop the drag operation reaches a preset threshold. For example, the user stops dragging the scrollable area for 5 seconds, and starts to play the $i^{th}$ video frame. For example, the start playback condition is that a start playing operation is received. For example, a user directly clicks on an $i^{th}$ video frame to start playing the $i^{th}$ video frame.

In some embodiments, a starting point of the drag operation is outside the video playback area; or a drag track of the drag operation does not intersect with the video playback area; or the drag track of the drag operation and a progress bar of the video playback area are independent of each other. For example, when the user drags the scrollable area, the drag operation on the scrollable area will not affect the progress bar of the video player, that is, the drag operation and a trigger operation on the progress bar are independent of each other. In this case, when the user browses the scrollable area, the displayed content of the video playback area may also change, so that the user can simultaneously browse the content of the scrollable area and the content of the video playback area, which can improve the efficiency of information acquisition.

To sum up, in the method provided in this embodiment, when a drag operation of dragging a page by the user is received, while scrolling the video playback area on the page according to the drag operation, the corresponding video frame is displayed on the video playback area according to the video progress indicated by a position where the video playback area has scrolled on the page. Therefore, an operation of scrolling and updating the page content by the user is associated with the frame displayed in the video playback area. The video frame is displayed according to the drag operation of the user. When the user scrolls the video playback area to different positions on the page, video frames of different video progress will be displayed on the video playback area, and the video frames will be displayed correspondingly according to the drag operation of the user. Furthermore, when the user scrolls the page content, the user is made to pay attention to the video playback area in the page, and the interaction and interest of the video content in the scrolling page are improved.

For example, the video frame display method provided in this application has two stages: a first stage and a second stage.

In the first stage, the video frame displayed in the video playback area changes with the position of the video playback area.

In the second stage, the video playback area will automatically play the target video.

The implementation of the first stage and the second stage will be described below.

For example, both the first stage and the second stage are executed with trigger conditions.

A trigger condition of the first stage is first introduced here, and a trigger condition of the second stage will be introduced in the following embodiments for introducing the second stage.

For example, a trigger condition of the first stage is that when the video playback area is displayed on the scrollable area, the first stage is triggered, and the video frame displayed in the video playback area may change with the position of the video playback area. That is, in response to the video playback area being displayed on the scrollable area, a video frame of the target video progress in the target video is displayed on the video playback area following the position of the video playback area on the scrollable area.

A moment when the video playback area is displayed on the scrollable area may be: a first pixel or a first row or column of pixels of the video playback area being displayed on the scrollable area. That is, in response to the first pixel or the first row or column of pixels of the video playback area being displayed on the scrollable area, a video frame of the target video progress in the target video is displayed on the video playback area following the position of the video playback area on the scrollable area.

The first pixel of the video playback area is not necessarily the first pixel of the video frame. For example, as shown in FIG. 3, the video playback area 302 further includes an area above the video frame 303 for displaying relevant information of the target video. When the scrollable area 301 is an area that is scrolled upward and updated, the first pixel of the video playback area 302 is a border of the video playback area, not a video frame.

Certainly, the moment when the video playback area is displayed on the scrollable area may further be: a first pixel or a first row or column of pixels of the video frame in the video playback area being displayed on the scrollable area. That is, in response to the first pixel or the first row or column of pixels of the video frame (the video frame display area) in the video playback area being displayed on the scrollable area, a video frame of the target video progress in the target video is displayed on the video playback area following the position of the video playback area on the scrollable area.

In addition, the moment when the video playback area is displayed on the scrollable area may further be: A last pixel in the video playback area is displayed on the scrollable area, or, a last pixel of the video frame (the video frame display area) in the video playback area is displayed on the scrollable area.

That is, in response to the last pixel or the last row or column of pixels of the video playback area being displayed on the scrollable area, a video frame of the target video progress in the target video is displayed on the video playback area following the position of the video playback area on the scrollable area.

Alternatively, in response to the last pixel or the last row or column of pixels of the video frame in the video playback area (the video frame display area) being displayed on the scrollable area, a video frame of the target video progress in the target video is displayed on the video playback area following the position of the video playback area on the scrollable area.

For example, the last pixel or the last row or column of pixels being displayed on the scrollable area is: all pixels of the video playback area having been displayed in the scrollable area, or all pixels of the video frame having been displayed in the scrollable area. In this way, the user has seen a complete video playback area or video frame. If the user is not interested in the video content, the video frame display method provided in this application may be triggered, so that the video frame displayed in the video playback area changes with the drag operation, thereby attracting the user to pay attention to the target video.

Certainly, for a determination that the video playback area is displayed on the scrollable area, the moment when the pixels in other positions on the video playback area are displayed on the scrollable area can also be used as a determination basis. For example, a midpoint of the video playback area is used as the determination basis, which is not limited in this embodiment.

For example, the implementation of the first stage is described.

Figure 4:
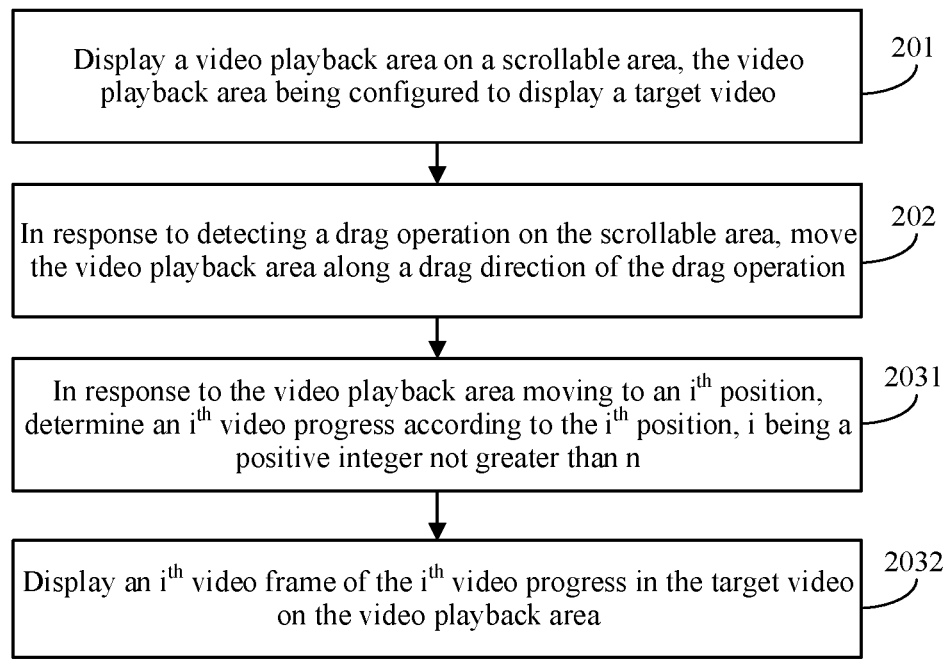
FIG. 4 is a method flowchart of a video frame display method according to another exemplary embodiment of this application.

FIG. 4 shows a flowchart of a video frame display method according to an exemplary embodiment of this application. The method may be performed by a client running on the terminal in the foregoing FIG. 1. Based on the exemplary embodiment shown in FIG. 2, step 203 includes step 2031 and step 2032.

Step 2031: Determine, in response to the video playback area moving to an $i^{th}$ position, an $i^{th}$ video progress according to the $i^{th}$ position, i being a positive integer not greater than n.

A moving path of the video playback area on the scrollable area includes n positions, each of the n positions corresponds to a video progress, a target video progress includes n video progresses corresponding to the n positions, and n is a positive integer.

For example, the movable position in the scrollable area corresponds to the video progress, and the movable position through which the video playback area passes on the scrollable area is the position. Therefore, the client can determine the video progress corresponding to the position according to the correspondence between the movable position and the video progress.

The movable position includes all position points within the scrollable area. Alternatively, the movable position includes a position point within the scrollable area to which the video playback area can move. Alternatively, the movable position includes part of position points within the scrollable area to which the video playback area can move. That is, the movable position is all or part of position points within the scrollable area. For example, the movable positions may all correspond to the video progress, or may partially correspond to the video progress. That is, all the position points in the scrollable area correspond to the video progress, or, part of the position points in the scrollable area correspond to the video progress.

The video progress refers to a time progress of the video, that is, a time point.

The formulation of the correspondence between the movable position and the video progress may be arbitrary. For example, a first part of position points (pixel points) in the movable position can be arbitrarily selected to correspond to a first video progress, and a second part of the position points (pixel points) can be arbitrarily selected to correspond to a second video progress, so that a correspondence between the movable position and the video progress is determined.

For example, video progresses corresponding to all movable positions may be part of video progresses of the target video, or the entire video progresses. When all movable positions only correspond to part of the video progresses of the target video, regardless of which position the video playback area moves to, only the video frame corresponding to the part of the video progresses will be displayed in the first stage.

In an embodiment, the correspondence between the movable position and the video progress may be determined according to a scrolling direction of the scrollable area. The scrolling direction of the scrollable area being longitudinal or lateral is used as an example for illustration below.

The scrollable area is a vertical scrolling area; and an ordinate of a movable position within the scrollable area has a correspondence to the video progress of the target video. Then the client obtains an $i^{th}$ ordinate corresponding to the $i^{th}$ position, where i is a positive integer not greater than n, and n is a positive integer; and obtains the $i^{th}$ video progress corresponding to the $i^{th}$ ordinate.

When the scrollable area is an area scrolling upward or downward, the video playback area moves upward or downward, and the ordinate of the position of the video playback area changes while the abscissa remains unchanged. Therefore, the ordinate of the movable position in the scrollable area can be bound to the video progress, and the corresponding video progress can be determined according to the ordinate of the movable position (the position) to which the video playback area moves.

The scrollable area is a lateral scrolling area; and an abscissa of a movable position within the scrollable area has a correspondence to the video progress of the target video. Then the client obtains an $i^{th}$ abscissa corresponding to the $i^{th}$ position, where i is a positive integer not greater than n, and n is a positive integer; and obtains the $i^{th}$ video progress corresponding to the $i^{th}$ abscissa.

When the scrollable area is an area scrolling leftward or rightward, the video playback area moves leftward or rightward, and the abscissa of the position of the video playback area changes while the ordinate remains unchanged. Therefore, the abscissa of the movable position in the scrollable area can be bound to the video progress, and the corresponding video progress can be determined according to the abscissa of the movable position (the position) to which the video playback area moves.

Figure 5:
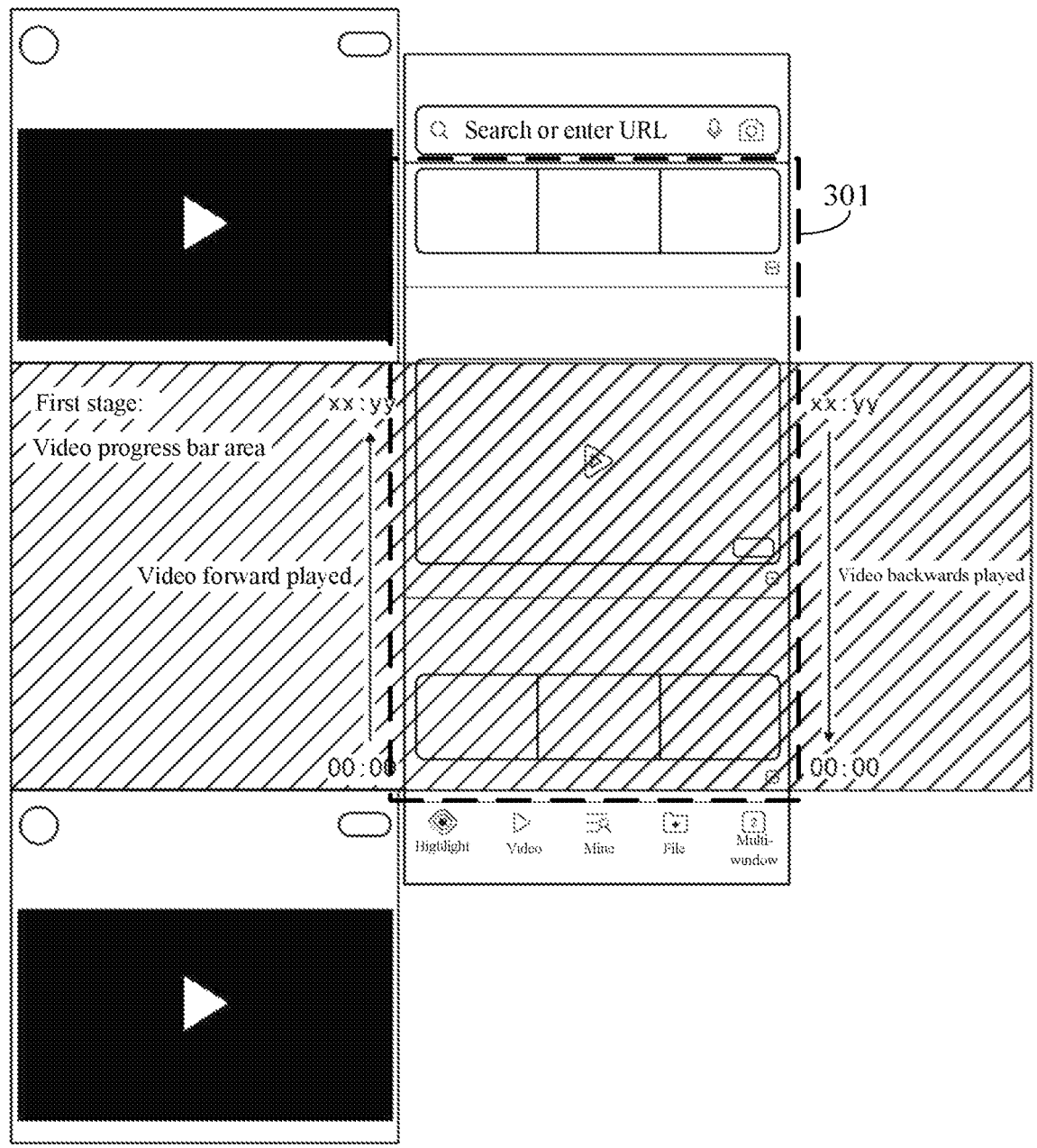
FIG. 5 is a schematic diagram of a user interface of a video frame display method according to another exemplary embodiment of this application.

For example, the scrollable area being a vertical scrolling area, and the updated direction being an upward sliding update is used as an example for description. As shown in FIG. 5, if the scrollable area is slided up to update, the video playback area moves upward from the bottom of the scrollable area. Therefore, the ordinate of the movable position in the scrollable area can be associated with the video progress. For example, as shown in FIG. 5, the position of a first row of pixels in the video playback area is taken as a reference for determining the position of the video playback area. When the first row of pixels is displayed in the scrollable area, a first stage of the video frame display method provided in this application is triggered. Pixels in a $0^{th}$ row (the movable position of the first row) at the bottom of the scrollable area are made to correspond to an aa:bb video progress, and pixels in an upper $h^{th}$ row (the movable position of the $h^{th}$ row) is made to correspond to an xx:yy video progress. The aa:bb video progress may be 00:00 or any video progress in the target video. The xx:yy video progress may be an end video progress of the target video, or any video progress in the target video. For example, the xx:yy video progress is after the aa:bb video progress. Each row of pixels between the $0^{th}$ row of pixels to the $h^{th}$ row of pixels corresponds to the video progress from aa:bb to xx:yy in turn. This is equivalent to longitudinally placing the progress bar of the target video. When the video playback area moves upward from the pixels in the $0^{th}$ row to the pixels in the $h^{th}$ row, the video frame of the target video from the aa:bb video progress to the xx:yy video progress is sequentially played on the video playback area, so as to realize a forward playback of the video frame of the target video. When the video playback area moves downward from the pixels of the $h^{th}$ row to the pixels of the $0^{th}$ row, the video frame of the target video from the xx:yy video progress to the aa:bb video progress is sequentially played on the video playback area, so as to realize a backward playback of the video frame of the target video.

For example, by setting the aa:bb video progress and the xx:yy video progress, the video progress that can be displayed in the video playback area in the first stage can be set. When it is set to the 00:00 video progress to the xx:yy video progress (a termination video progress of the target video), in the first stage, the user can scroll by repeatedly dragging the scrollable area to repeatedly watch all the video frames of the target video.

Figure 6:
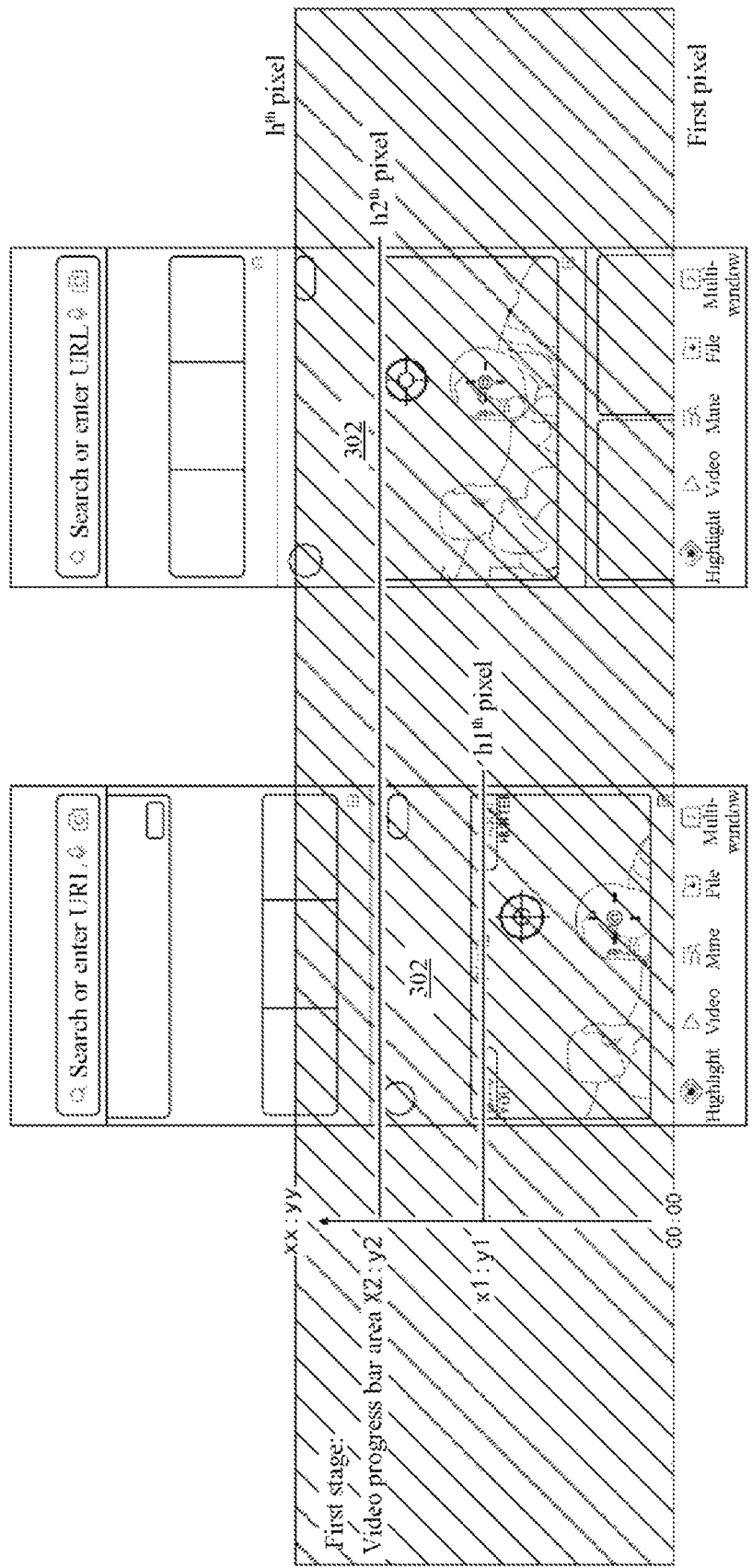
FIG. 6 is a schematic diagram of a user interface of a video frame display method according to another exemplary embodiment of this application.

Taking the aa:bb video progress being 00:00 as an example, as shown in FIG. 5, when the first pixel of the video playback area is displayed on the scrollable area, that is, when the pixels in the 0th row of the scrollable area are displayed as the video playback area, the first stage of the video frame display method provided in this application is triggered. As shown in FIG. 6, in the scrollable area, from the pixels in the 0th row at the bottom corresponds to the 00:00 video progress, and the pixels in the $h^{th}$ row corresponds to the xx:yy video progress, the video progress corresponding to each row of pixels between the pixels in the $0^{th}$ row and the pixels in the $h^{th}$ row is determined in order. The x1:y1 video progress corresponds to the pixels in the $h1^{th}$ row, and the x2:y2 video progress corresponds to the pixels in the $h2^{th}$ row. Then, when the video playback area 302 moves from the pixels in the $h1^{th}$ row to the pixels in the $h2^{th}$ row, the video playback area 302 sequentially displays the video frames from the x1:y1 video progress to the x2:y2 video progress.

The example shown in FIG. 5 is only an example. The example from the pixels in the $0^{th}$ row to the pixels in the $h^{th}$ row in FIG. 5 may be replaced by the pixels from the $h1^{th}$ row to the $h2^{th}$ row of pixels at the bottom of the scrollable area 301, and h1 is greater than h2. That is, an ordinate of pixel points in the middle part of the scrollable area 301 is set to correspond to the video progress. If the height of the video playback area is set to h1, the first stage can be triggered when the complete video playback area is displayed on the scrollable area. If the video playback area continues to move upward, the video playback area will display the corresponding video screen according to the video progress corresponding to the position. If the video playback area continues to move upward, the video playback area will display the corresponding video frame according to the video progress corresponding to the position.

When the scrollable area is a lateral scrolling area, reference may be made to a design idea of longitudinally scrolling, and an abscissa of the movable position is made to correspond to the video progress.

Step 2032 Display an $i^{th}$ video frame of the $i^{th}$ video progress in the target video on the video playback area.

For example, in the first stage, the client displays the video frame according to a track position where the video playback area is located, that is, the $i^{th}$ video frame is displayed at an $i^{th}$ track position, and the $i^{th}$ track position corresponds to the $i^{th}$ video progress corresponding to the $i^{th}$ video frame. The user can change the video frame displayed on the video playback area by changing the position of the video playback area through the drag operation in the first stage.

In this stage, the video playback area does not play the target video, that is, does not play the sound of the target video, and only displays the frame according to the position. Duration displayed by each video frame is equal to duration of the video playback area staying at that position. The user can quickly slide the position of the video playback area, so as to achieve an effect of quickly playing the video frame of the target video. A display order of the video frame (forward or backwards) is positively related to a direction of the moving path of the video playback area. If the drag operation of the user stops and the video playback area stops at a certain position in the scrollable area, a still video frame corresponding to the position is displayed on the video playback area.

To sum up, in the method provided in this embodiment, the video frame corresponding to the video progress is displayed according to the position of the video playback area while moving the position of the video playback area, which enables the user to display the video frame of the target video at different playback speeds and playback sequences in the video playback area by using different sliding information flow when browsing the information flow. The interactivity between the user when sliding the information flow and the video playback area is increased, the user is attracted to paying attention to the video playback area in the information flow, and the interest of the video display in the information flow is improved.

In the method provided in this embodiment, when the scrollable area is a vertical scrolling area, the ordinate of the movable position in the scrollable area is bound to the video progress, and the corresponding video progress is obtained by the ordinate of the position of the video playback area. When the scrollable area is a lateral scrolling area, the abscissa of the movable position in the scrollable area is bound to the video progress, and the corresponding video progress is obtained by the abscissa of the position of the video playback area.

For example, to further enrich a presentation mode of videos, on the basis of the first stage, the embodiment of this application provides a presentation method for the second stage, that is, when the trigger condition of the second stage is satisfied, the target video is automatically played in the video playback area.

Figure 7:
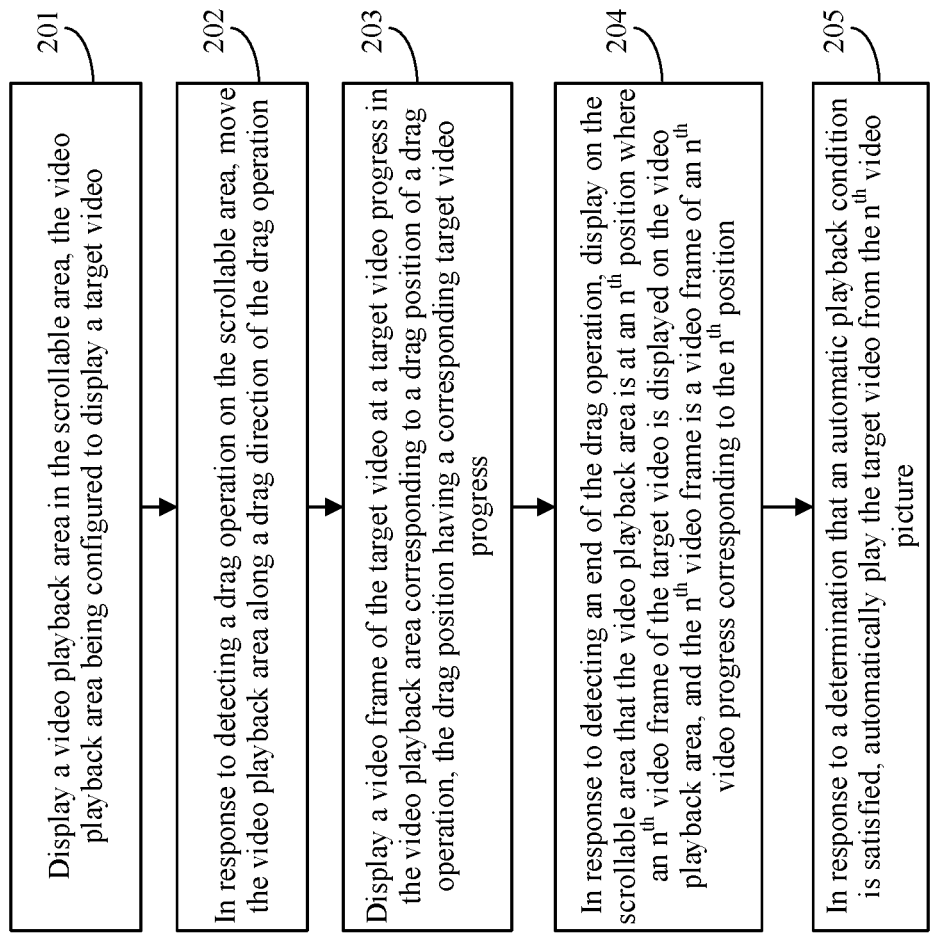
FIG. 7 is a method flowchart of a video frame display method according to another exemplary embodiment of this application.

FIG. 7 shows a flowchart of a video frame display method according to an exemplary embodiment of this application. The method may be performed by a client running on the terminal in the foregoing FIG. 1. Based on the exemplary embodiment shown in FIG. 2, step 203 further includes step 204 and step 205.

Step 204: Display on the scrollable area that the video playback area is at an $n^{th}$ position in response to ending the drag operation, where an $n^{th}$ video frame of the target video is displayed on the video playback area, and the $n^{th}$ video frame is a video frame of an $n^{th}$ video progress corresponding to the $n^{th}$ position.

A moving path of the video playback area on the scrollable area according to the drag operation includes n positions, and n is a positive integer.

For example, one drag operation can move the video playback area by one moving path. When one drag operation ends, the video playback area stops at a position. For a trigger determination of the second stage, it may be determined whether the current state satisfies a trigger condition when each drag operation ends; or it is determined whether a real-time state satisfies the trigger condition during the drag operation.

Taking the trigger condition of the second stage being a threshold progress as an example, that is, when a video frame exceeding the threshold progress is displayed on the video playback area, the target video is automatically played. In an implementation, in response to ending a drag operation, the client obtains a corresponding $n^{th}$ video progress according to an $n^{th}$ position of a current video playback area, and determines whether the $n^{th}$ video progress is greater than or equal to the threshold progress. If the $n^{th}$ video progress is greater than or equal to the threshold progress, the second stage is triggered, and the target video is automatically played from the $n^{th}$ video frame corresponding to the $n^{th}$ position. In another implementation, the client detects in real time whether the video progress corresponding to the video frame currently displayed in the video playback area is greater than or equal to the threshold progress. If the progress is greater than or equal to the threshold progress, the second stage is triggered regardless of whether the current drag operation ends, and the target video is automatically played from the video frame corresponding to the current video progress.

In this embodiment, only the trigger determination of the second stage is performed after each drag operation ends as an example for illustration.

Step 205: Automatically play the target video from the $n^{th}$ video frame in response to satisfying an automatic playback condition.

After the drag operation ends, the client determines whether the trigger condition (an automatic playback condition) of the second stage is met, if so, the target video is automatically played; and if not, the method of the first stage is still used to display the target video.

This embodiment provides two automatic playback conditions. One is to set a threshold progress, and the other is to use the position of a marking element on the video playback area to determine.

For a first automatic playback condition, in response to the $n^{th}$ video progress corresponding to the $n^{th}$ position reaching the threshold progress, the client automatically plays the target video from the $n^{th}$ video frame.

The threshold progress is a video progress preset for the target video, which is used for determining whether to trigger automatic playback. The threshold progress may be set to any video progress in the target video. For example, if the target video is a two-minute video, the threshold progress can be set to a one-minute video progress. For example, the threshold progress can also be set according to a video highlight clip of the target video, and the moment when the video highlight clip starts is set as the threshold progress, so that the video playback area starts to automatically play from the video highlight clip.

For a second automatic playback condition, a marking element is further displayed on the video playback area. The marking element is an independent element displayed on the video frame. The client displays on the video playback area that the marking element moves along the fixed track following the drag operation, that is, the marking element moves on the video playback area according to the preset fixed track.

Figure 8:
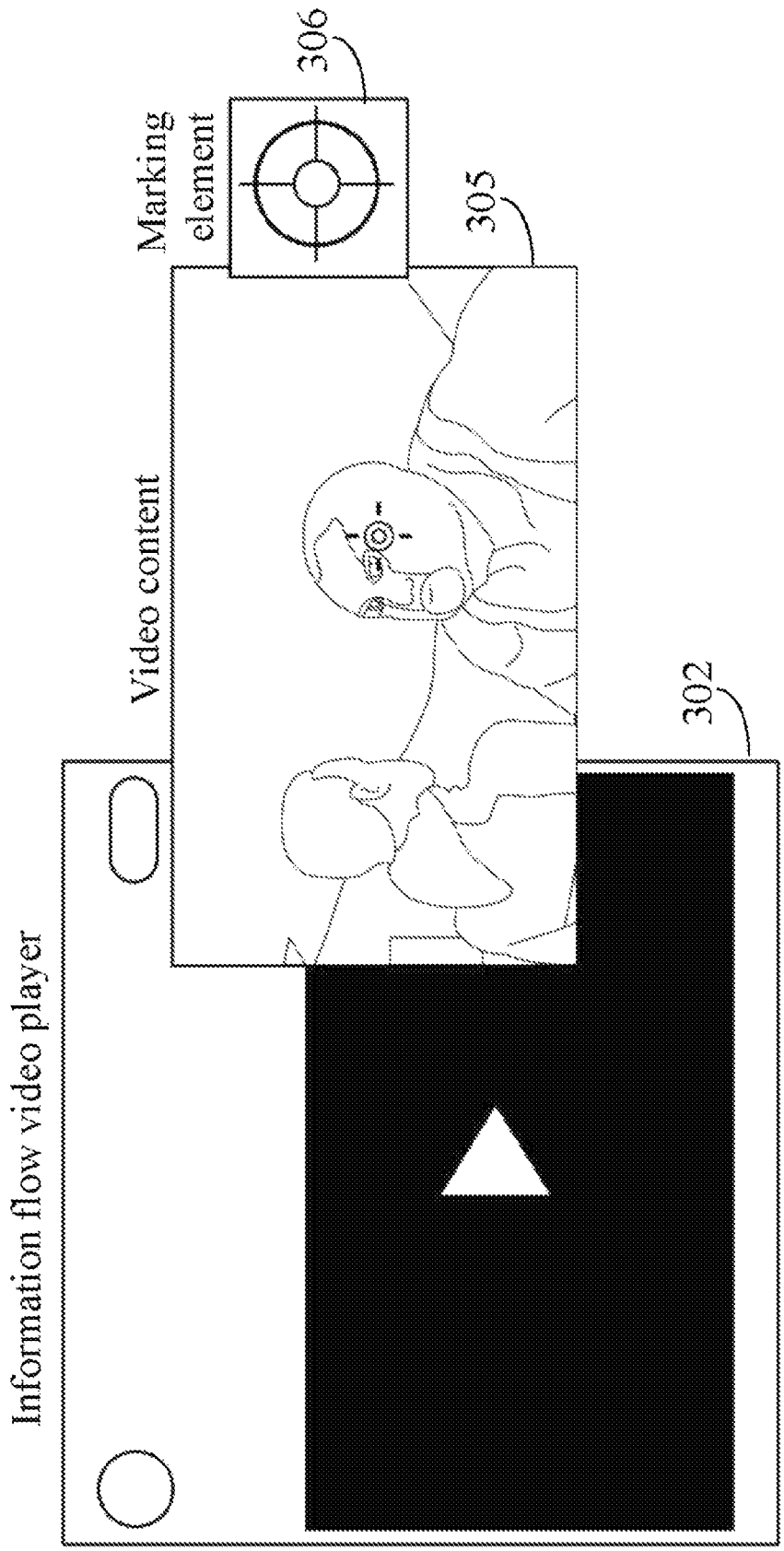
FIG. 8 is a schematic diagram of a marking element of a video frame display method according to another exemplary embodiment of this application.

For example, as shown in FIG. 8, a video frame 305 of a target video is displayed on a frame display area of a video playback area 302, and a marking element 306 is displayed on an upper layer of the video frame 305. When a first pixel of the video playback area is displayed on the scrollable area, the marking element moves according to a fixed track.

For example, in response to the first pixel of the video playback area being displayed on the scrollable area, the marking element moves from an initial position to a target position along the fixed track.

The movement of the marking element is not synchronized with the playback of the video frame, and the movement speed and moving path of the marking element have nothing to do with the position of the video playback area and the video frame displayed in the video playback area. That is, in the first stage, the playback speed of the video frame will change with the movement speed of the video playback area, but the movement speed of the marking element will not change correspondingly.

For example, the moving direction of the marking element will change with the drag direction of the drag operation, that is, the moving direction of the marking element will change with the moving direction of the video playback area. In response to the drag direction being a first direction, the marking element moving forward along the fixed track to the target position is displayed on the video playback area. The first direction is an updated direction of the scrollable area, and the target position is an end point of the fixed track. In response to the drag direction being a second direction, the marking element moving backwards along the fixed track to an initial position is displayed on the video playback area. The second direction is an opposite direction of an updated direction of the scrollable area, and the initial position is a starting point of the fixed track. In response to not receiving a drag operation, the marking element is displayed as still on the video playback area.

That is, when the video playback area moves along the updated direction, the marking element moves forward along the fixed track. When the video playback area moves in an opposite direction of the updated direction, the marking element moves backwards along the fixed track, and when the video playback area does not move, the marking element stays still.

A movement track of the marking element is a polyline including an initial position (initial coordinates), a target position (end coordinates) and an intermediate position (intermediate coordinates). The marking element moves from the initial coordinates to first intermediate coordinates along a line in sequence, and then moves from the first intermediate coordinates to second intermediate coordinates along the line, until it moves from the last intermediate coordinates to the end coordinates. For example, the intermediate position may not be set, but only the initial position and the target position may be set, and the fixed track is a straight line from the initial position to the target position.

Figure 9:
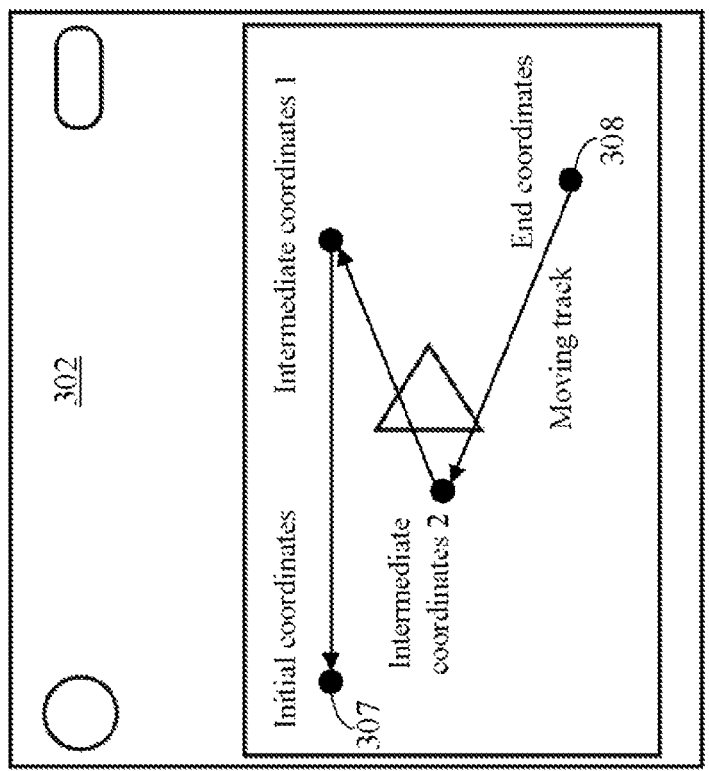
FIG. 9 is a schematic diagram of a video playback area of a video frame display method according to another exemplary embodiment of this application.
Figure 9:
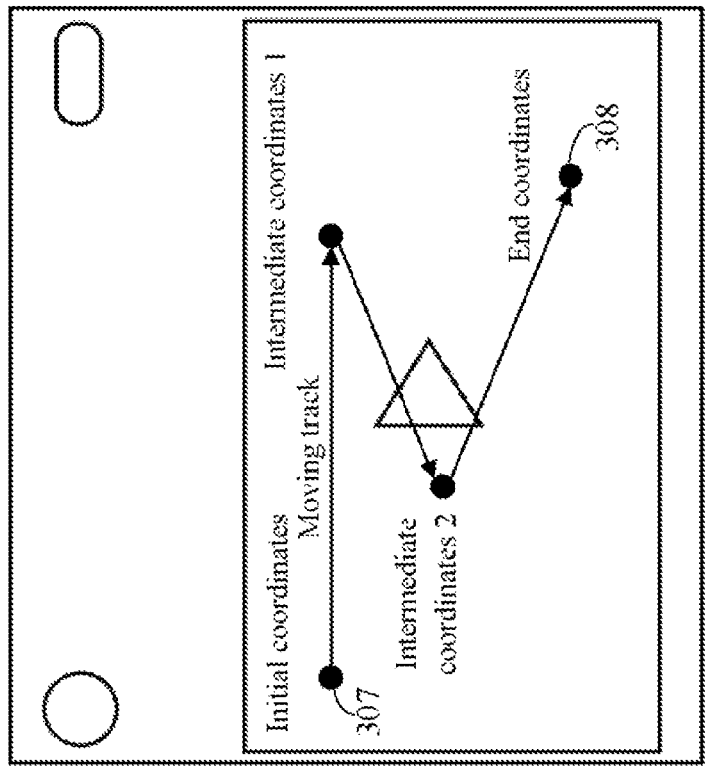

For example, as shown in FIG. 9 (1), when the drag direction of the drag operation is the updated direction of the scrollable area, the marking element moves forward along the fixed track from the initial position 307 through the intermediate position to the target position 308. As shown in FIG. 9 (2), when the drag direction of the drag operation is the opposite direction of the updated direction of the scrollable area, the marking element moves backwards from the current position to the initial position 307 along the fixed track.

The client automatically plays the target video from the $n^{th}$ video frame, in response to the marking element moving to a target position, the fixed track including the target position. When the drag operation ends and the marking element has moved to the target position, the client automatically plays the video from the $n^{th}$ video frame displayed on the video playback area when the drag operation ends.

In an implementation, if the marking element has moved to the target position before the drag operation ends, the marking element stops at the target position. In another implementation, if the marking element has moved to the target position, but the drag operation has not ended, the first stage is stopped and the second stage is triggered, and the client automatically plays the video from the video frame corresponding to the current position of the video playback area.

Figure 10:
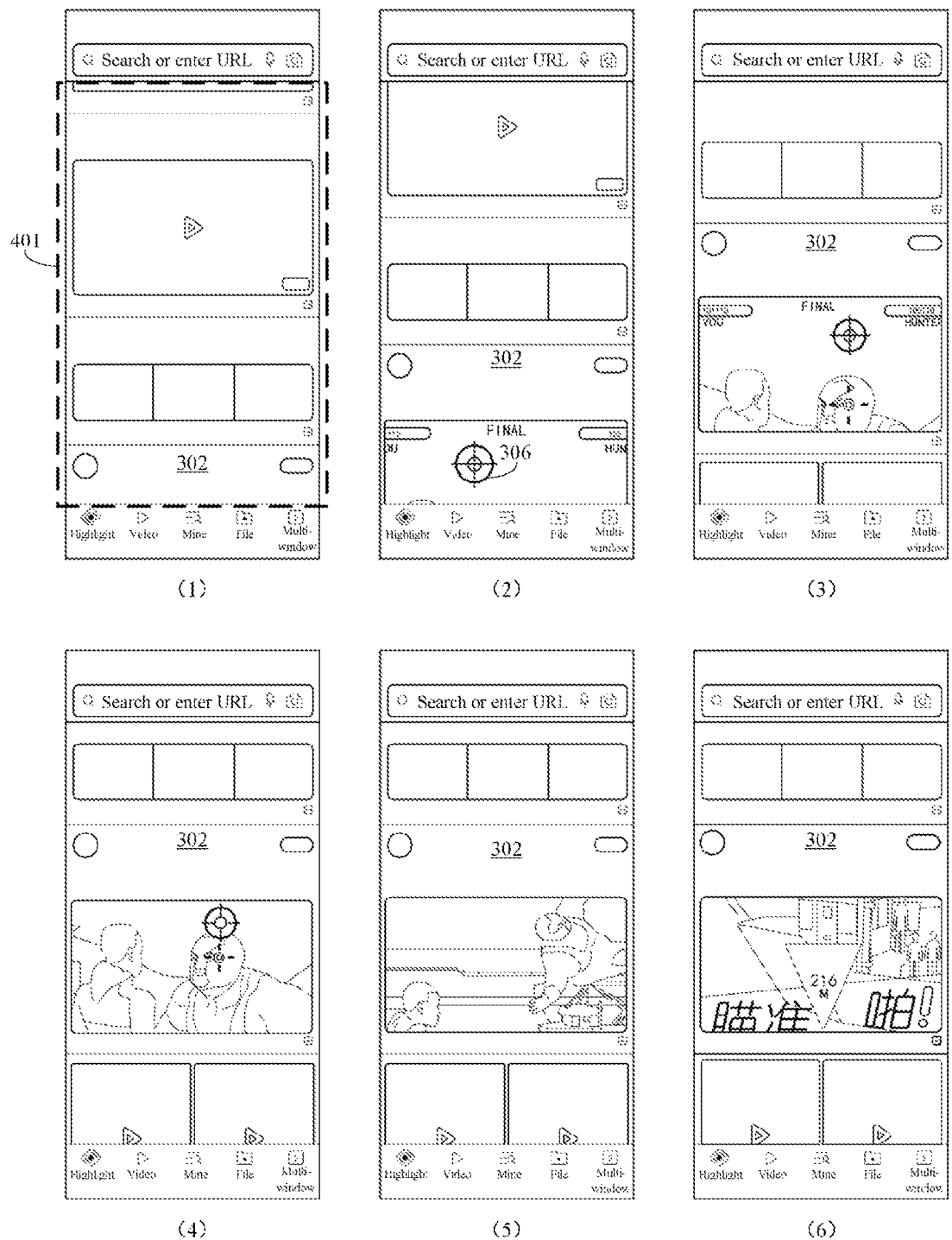
FIG. 10 is a schematic diagram of a user interface of a video frame display method according to another exemplary embodiment of this application.

FIG. 10 shows a schematic diagram of a user interface for displaying a first stage and a second stage of the video by using the video frame display method provided in this application. As shown in FIG. 10 (1), (2), (3), and (4), the information flow displayed in the information flow display area 401 of the user interface includes the video playback area 302. The updated direction of the information flow is sliding upward, and the user can slide up or down to move the display position of information flow content in the information flow, so that new information flow content is displayed in the user interface. When a first pixel of the video playback area 302 is displayed in an information flow display area 401 in the user interface, the first stage is triggered. The client displays the video frame of the target video progress on the video playback area following the position of the video playback area 302 on the information flow display area 401. In addition, the marking element 306 on the video frame moves to the target position along a fixed track. As shown in FIG. 10 (4), when the marking element 306 moves to the target position and the drag operation stops, the second stage is triggered. As shown in FIG. 10 (5) and (6), the video playback area 302 automatically plays the target video.

To sum up, in the method provided in this embodiment, when the automatic playback condition is satisfied, the target video is automatically played in the video playback area. The automatic playback condition can be set according to the video progress, or by adding a marking element on the video playback area, and then setting the automatic playback condition according to the position of the marking element, thereby increasing the interactivity between the video display and user operations. By making the video frame follow the position of the video playback area in the first stage, the video is automatically played in the second stage, and some highlights and key excerpts of the video are highlighted, which enhances the interactivity and relevance of the video, so that the user can focus on the video content, and both communication of the video content and a sense of control of the user are well reflected. In addition, it has more commercialization potential in game distribution and interactive advertising. It can highlight selling points of games and commodities, and extract key information. It is a new type of commercial advertising that can be tried and innovative. For game introduction videos and game interactive videos, gameplay can be refined and game attributes can be strengthened, such as shooting, elimination and other game attributes, so that users can more intuitively understand the gameplay and content of the game.

The following describes apparatus embodiments of this application. For details not described in detail in the apparatus embodiments, reference may be made to the foregoing method embodiments.

Figure 11:
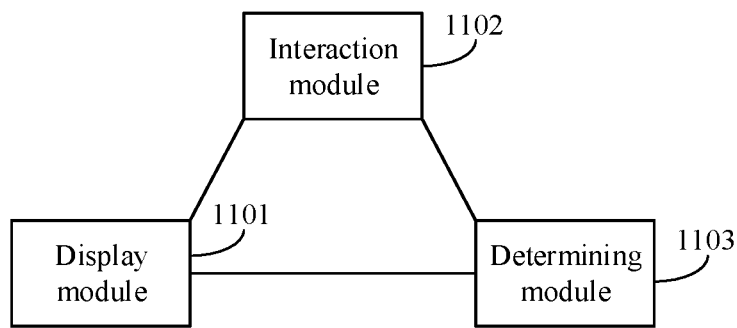
FIG. 11 is an apparatus block diagram of a video frame display apparatus according to another exemplary embodiment of this application.

FIG. 11 is a block diagram of a video frame display apparatus according to an exemplary embodiment of this application. The apparatus includes:

- a display module 1101, configured to display a scrollable area, a video playback area being displayed on the scrollable area, the video playback area being configured to display a target video; and
- an interaction module 1102, configured to receive a drag operation acting on the scrollable area;
- the display module 1101 being configured to move, in response to receiving a drag operation performed on the scrollable area, the video playback area along a drag direction of the drag operation on the scrollable area; and
- the display module 1101 being configured to display a video frame of a target video progress in the target video on the video playback area following a position of the video playback area on the scrollable area, the position having a correspondence to the target video progress.

In an embodiment, the scrolling area is configured to display information flow, and at least one information flow content in the information flow is a video playback area.

In an embodiment, the information flow includes a plurality of information flow content arranged according to an updated direction. In the scrollable area, the information flow content in the information flow moves forward according to the updated direction, or moves backwards according to an opposite direction of the updated direction.

In an embodiment, a moving path of the video playback area includes n positions that has moved on the scrollable area, each of then positions corresponds to a video progress, the target video progress includes n video progresses corresponding to the n positions, and n is a positive integer. The apparatus further includes:

- a determining module 1103, configured to determine, in response to the video playback area moving to an $i^{th}$ position, an $i^{th}$ video progress according to the $i^{th}$ position, where i is a positive integer not greater than n; and
- the display module 1101 being configured to display an $i^{th}$ video frame of the $i^{th}$ video progress in the target video on the video playback area.

In an embodiment, the scrollable area is a vertical scrolling area; where an ordinate of a movable position within the scrollable area has a correspondence to the video progress of the target video;

- the determining module 1103 is configured to obtain an $i^{th}$ ordinate corresponding to the $i^{th}$ position, where i is a positive integer not greater than n, and n is a positive integer; and
- the determining module 1103 is configured to obtain the $i^{th}$ video progress corresponding to the $i^{th}$ ordinate.

In an embodiment, the scrollable area is a lateral scrolling area; where an abscissa of a movable position within the scrollable area has a correspondence to the video progress of the target video; and

- the determining module 1103 is configured to obtain an $i^{th}$ abscissa corresponding to the $i^{th}$ position, where i is a positive integer not greater than n, and n is a positive integer; and the determining module 1103 is configured to obtain the $i^{th}$ video progress corresponding to the $i^{th}$ abscissa.

In an embodiment, the display module 1101 is configured to start playing the target video from the $i^{th}$ video frame of the $i^{th}$ video progress in response to satisfying a start playback condition; or replaying the target video in response to satisfying the start playback condition.

In an embodiment, a starting point of the drag operation is outside the video playback area; or a drag track of the drag operation does not intersect with the video playback area; or the drag track of the drag operation and a progress bar of the video playback area are independent of each other.

In an embodiment, a moving path of the video playback area on the scrollable area according to the drag operation includes n positions, and n is a positive integer.

The display module 1101 is configured to display on the scrollable area that the video playback area is at an $n^{th}$ position in response to ending the drag operation, where an $n^{th}$ video frame of the target video is displayed on the video playback area, and the $n^{th}$ video frame is a video frame of an $n^{th}$ video progress corresponding to the $n^{th}$ position; and the display module 1101 is configured to automatically play the target video from the $n^{th}$ video frame in response to satisfying an automatic playback condition.

In an embodiment, the target video corresponds to a threshold progress; and the display module 1101 is configured to automatically play the target video from the $n^{th}$ video frame in response to the $n^{th}$ video progress corresponding to the $n^{th}$ position reaching the threshold progress.

In an embodiment, a marking element is displayed on the video playback area;

the display module 1101 is configured to display on the video playback area that the marking element moves along a fixed track following the drag operation; and the display module 1101 is configured to automatically play the target video from the $n^{th}$ video frame in response to the marking element moving to a target position, the fixed track including the target position.

In an embodiment, the movement of the marking element is not synchronized with the playback of the video frame, and the moving speed and moving path of the marking element have nothing to do with the position of the video playback area and the video frame displayed in the video playback area.

In an embodiment, the display module 1101 is configured to display on the video playback area that the marking element moves forward along the fixed track to the target position in response to the drag direction being a first direction, where the first direction is an updated direction of the scrollable area, and the target position is an end point of the fixed track.

In an embodiment, the display module 1101 is configured to display on the video playback area that the marking element moves backwards along the fixed track to an initial position in response to the drag direction being a second direction, where the second direction is an opposite direction of an updated direction of the scrollable area, and the initial position is a starting point of the fixed track.

In an embodiment, the display module 1101 is configured to display the video frame of the target video progress in the target video on the video playback area following the position of the video playback area on the scrollable area in response to a first pixel of the video playback area being displayed on the scrollable area.

The video frame display apparatus provided in the foregoing embodiments is merely illustrated with an example of division of each functional module. In practical application, the function distribution may be implemented by different functional modules according to requirements, that is, an internal structure of the device is divided into different functional modules, to implement all or some of the functions described above. In addition, the video frame display apparatus and the video frame display method provided in the foregoing embodiments belong to the same conception. For the specific implementation process, reference may be made to the method embodiments, and details are not described herein again.

This application further provides a terminal, the terminal includes a processor and a memory, the memory stores at least one instruction, and the at least one instruction is loaded and executed by the processor to implement the video frame display method provided in the foregoing various method embodiments. The terminal may be a terminal provided in FIG. 12 below.

Figure 12:
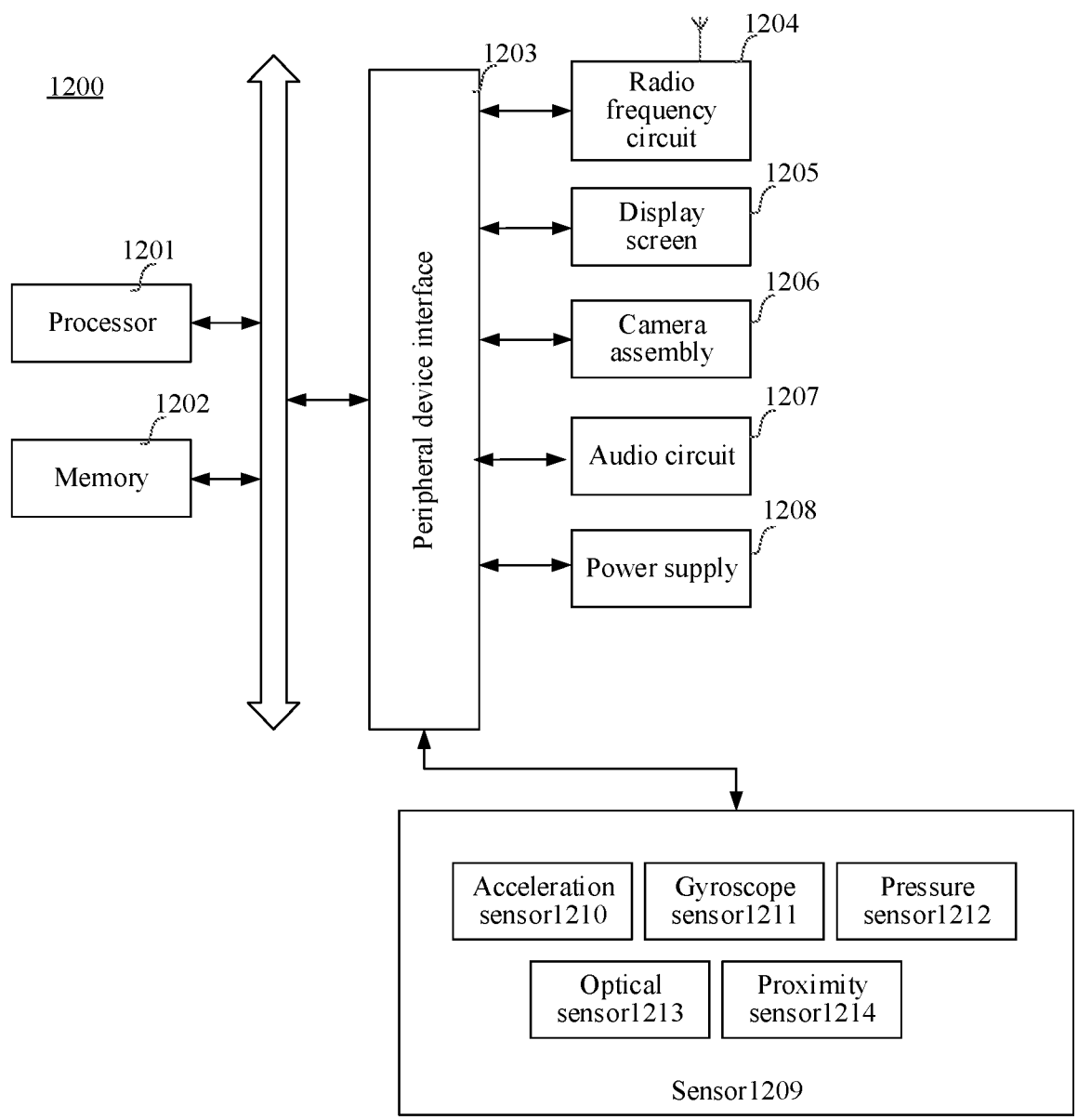
FIG. 12 is a block diagram of a terminal according to another exemplary embodiment of this application.

FIG. 12 shows a structural block diagram of a terminal 1200 according to an exemplary embodiment of this application. The terminal 1200 may be: a smartphone, a tablet computer, a Moving Picture Experts Group Audio Layer III (MP3) player, a Moving Picture Experts Group Audio Layer IV (MP4) player, a notebook computer, or a desktop computer. The terminal 1200 may also be referred to as other names such as user equipment, a portable terminal, a laptop terminal, or a desktop terminal.

Generally, the terminal 1200 includes: a processor 1201 and a memory 1202.

The processor 1201 may include one or more processing cores, such as a 4-core processor or an 8-core processor. The processor 1201 may be implemented by using at least one hardware form of a digital signal processor (DSP), a field-programmable gate array (FPGA), and a programmable logic array (PLA). The processor 1201 may alternatively include a main processor and a coprocessor. The main processor is configured to process data in an active state, also referred to as a CPU. The coprocessor is a low-power consumption processor configured to process data in a standby state. In some embodiments, the processor 1201 may be integrated with a graphics processing unit (GPU). The GPU is responsible for rendering and drawing content to be displayed by a display screen. In some embodiments, the processor 1201 may further include an artificial intelligence (AI) processor. The AI processor is configured to process computing operations related to machine learning.

The memory 1202 may include one or more computer-readable storage media. The computer-readable storage media may be non-transitory. The memory 1202 may further include a high-speed random access memory, and a non-volatile memory such as one or more magnetic disk storage devices and a flash storage device. In some embodiments, the non-transitory computer-readable storage medium in the memory 1202 is configured to store at least one instruction, and the at least one instruction is configured to be executed by the processor 1201 to implement the video frame display method provided in the method embodiments of this application.

In some embodiments, the terminal 1200 includes: a peripheral device interface 1203 and at least one peripheral device. The processor 1201, the memory 1202, and the peripheral device interface 1203 may be connected by using a bus or a signal cable. Each peripheral device may be connected to the peripheral device interface 1203 by using a bus, a signal cable, or a circuit board. Specifically, the peripheral device includes: at least one of a radio frequency circuit 1204, a display screen 1205, a camera assembly 1206, an audio circuit 1207, and a power supply 1208.

The peripheral device interface 1203 may be configured to connect at least one peripheral device related to input/output (I/O) to the processor 1201 and the memory 1202.

The RF circuit 1204 is configured to receive and transmit an RF signal, also referred to as an electromagnetic signal. The RF circuit 1204 communicates with a communication network and another communication device by using the electromagnetic signal.

The display screen 1205 is configured to display a user interface (UI).

The camera assembly 1206 is configured to capture an image or a video.

The audio circuit 1207 may include a microphone and a speaker.

The power supply 1208 is configured to supply power to components in the terminal 1200.

In some embodiments, the terminal 1200 may further include one or more sensors 1209. The one or more sensors 1209 include but are not limited to an acceleration sensor 1210, a gyro sensor 1211, a pressure sensor 1212, an optical sensor 1213, and a proximity sensor 1214.

A person skilled in the art may understand that the structure shown in FIG. 12 does not constitute a limitation to the terminal 1200, and the terminal may include more components or fewer components than those shown in the figure, or some components may be combined, or a different component deployment may be used.

The memory further includes one or more programs. The one or more programs are stored in the memory. The one or more programs include the video frame display method provided in the embodiments of this application.

This application provides a computer-readable storage medium, the storage medium storing at least one instruction, the at least one instruction being loaded and executed by the processor to implement the video frame display method provided in the foregoing various method embodiments.

In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

This application further provides a computer program product or a computer program. The computer program product or the computer program includes computer instructions, and the computer instructions are stored in a computer-readable storage medium. A processor of a computer device reads the computer instructions from the computer-readable storage medium, and executes the computer instructions, so that the computer device performs the video frame display method provided in the foregoing optional implementation.

What is claimed is:

1. A video frame display method, performed by a computer device, the method comprising:
    displaying a video playback area in a scrollable area, the video playback area being configured to display a target video;

detecting a first drag operation on the scrollable area;
moving the video playback area along a drag direction of the first drag operation;
displaying a first video frame of the target video at a first target video progress in the video playback area corresponding to a first position of the video playback area on the scrollable area according to an end of the first drag operation, the first position being associated with the first target video progress of the target video and the first target video progress of the target video does not exceed a threshold progress, wherein the threshold progress is based on a length of the target video or a video highlight clip of the target video;
detecting a second drag operation on the scrollable area following the first drag operation;
moving the video playback area further along the drag direction of the second drag operation;
displaying a second video frame of the target video at a second target video progress in the video playback area corresponding to a second position of the video playback area on the scrollable area according to an end of the second drag operation, the second position being associated with the second target video progress of the target video;
determining that the position of the video playback area on the scrollable area according to the second drag operation exceeding the threshold progress; and
automatically playing the target video starting from the second video frame.

2. The method according to claim 1, wherein a moving path of the video playback area on the scrollable area according to the end of the first drag operation comprises n positions, each of the n positions having a respective video progress, the target video progress comprises n video progresses corresponding to the n positions, and n is a positive integer, and
the displaying a first video frame of the target video at a first target video progress in the video playback area further comprises:
determining that the video playback area moves to an $i^{th}$ position, and determining an $i^{th}$ video progress according to the $i^{th}$ position, wherein i is a positive integer not greater than n; and
displaying an $i^{th}$ video frame of the $i^{th}$ video progress of the target video in the video playback area.

3. The method according to claim 2, wherein the scrollable area is a vertical scrolling area; an ordinate of a position within the scrollable area has a corresponding video progress of the target video,
the determining an $i^{th}$ video progress according to the $i^{th}$ position further comprises:
obtaining an $i^{th}$ ordinate corresponding to the $i^{th}$ position, wherein i is a positive integer not greater than n, and n is a positive integer; and
obtaining the $i^{th}$ video progress corresponding to the $i^{th}$ ordinate.

4. The method according to claim 2, wherein the scrollable area is a lateral scrolling area, an abscissa of a position within the scrollable area has a corresponding video progress of the target video, and
the determining an $i^{th}$ video progress according to the $i^{th}$ position further comprises:
obtaining an $i^{th}$ abscissa corresponding to the $i^{th}$ position, wherein i is a positive integer not greater than n, and n is a positive integer; and
obtaining the $i^{th}$ video progress corresponding to the $i^{th}$ abscissa.

5. The method according to claim 2, further comprising:
in response to a determination that a start playback condition is satisfied, playing the target video starting from the $i^{th}$ video frame of the $i^{th}$ video progress; or
replaying the target video.

6. The method according to claim 1, wherein
a starting point of the drag operation is outside the video playback area; or
a drag track of the drag operation does not intersect with the video playback area; or
the drag track of the drag operation and a progress bar of the video playback area are independent of each other.

7. The method according to claim 1, wherein a moving path of the video playback area on the scrollable area according to the end of the second drag operation comprises n positions, and n is a positive integer, the method further comprises:
displaying on the scrollable area that the video playback area is at an $n^{th}$ position, wherein an $n^{th}$ video frame of the target video is displayed on the video playback area, and the $n^{th}$ video frame is a video frame of an $n^{th}$ video progress corresponding to the $n^{th}$ position; and
in response to a determination that an automatic playback condition is satisfied:
automatically playing the target video from the $n^{th}$ video frame.

8. The method according to claim 7, wherein
the automatically playing the target video from the $n^{th}$ video frame further comprises:
in response to a determination that the $n^{th}$ video progress corresponding to the $n^{th}$ moving position reaches the threshold progress, automatically playing the target video from the $n^{th}$ video frame.

9. The method according to claim 7, wherein a marking element is displayed on the video playback area, and the method further comprises:
displaying movement of the marking element along a fixed track in the video playback area that follows the drag operation; and
the automatically playing the target video from the $n^{th}$ video frame further comprises:
determining that the marking element moves to a target position, and automatically playing the target video from the $n^{th}$ video frame, and wherein the fixed track includes the target position.

10. The method according to claim 1, wherein the displaying a first video frame of the target video at a first target video progress in the video playback area comprises:
in response to the video playback area being displayed on the scrollable area, displaying the first video frame of the target video at the first target video progress in the video playback area that follows the first position of the video playback area on the scrollable area.

11. An electronic device, comprising:
one or more processors; and
memory storing one or more programs, the one or more programs comprising instructions that, when executed by the one or more processors, cause the one or more processors to perform operations comprising:
displaying a video playback area in a scrollable area, the video playback area being configured to display a target video;
detecting a first drag operation on the scrollable area;
moving the video playback area along a drag direction of the first drag operation;

displaying a first video frame of the target video at a first target video progress in the video playback area corresponding to a first position of the video playback area on the scrollable area according to an end of the first drag operation, the first position being associated with the first target video progress of the target video and the first target video progress of the target video does not exceed a threshold progress, wherein the threshold progress is based on a length of the target video or a video highlight clip of the target video;

detecting a second drag operation on the scrollable area following the first drag operation;

moving the video playback area further along the drag direction of the second drag operation;

displaying a second video frame of the target video at a second target video progress in the video playback area corresponding to a second position of the video playback area on the scrollable area according to an end of the second drag operation, the second position being associated with the second target video progress of the target video;

determining that the position of the video playback area on the scrollable area according to the second drag operation exceeding the threshold progress; and automatically playing the target video starting from the second video frame.

12. The electronic device of claim 11, wherein a moving path of the video playback area on the scrollable area according to the end of the first drag operation comprises n positions, each of the n positions having a respective video progress, the target video progress comprises n video progresses corresponding to the n positions, and n is a positive integer, and the displaying a first video frame of the target video at a first target video progress in the video playback area further comprises:

in response to the video playback area moving to an $i^{th}$ position, determining an $i^{th}$ video progress according to the $i^{th}$ position, wherein i is a positive integer not greater than n; and displaying an $i^{th}$ video frame of the $i^{th}$ video progress of the target video in the video playback area.

13. The electronic device of claim 12, wherein the scrollable area is a vertical scrolling area; an ordinate of a position within the scrollable area has a corresponding video progress of the target video, the determining an $i^{th}$ video progress according to the $i^{th}$ position further comprises:

obtaining an $i^{th}$ ordinate corresponding to the $i^{th}$ position, wherein i is a positive integer not greater than n, and n is a positive integer; and obtaining the $i^{th}$ video progress corresponding to the $i^{th}$ ordinate.

14. The electronic device of claim 12, wherein the scrollable area is a lateral scrolling area, an abscissa of a position within the scrollable area has a corresponding video progress of the target video, and the determining an $i^{th}$ video progress according to the $i^{th}$ position further comprises:

obtaining an $i^{th}$ abscissa corresponding to the $i^{th}$ position, wherein i is a positive integer not greater than n, and n is a positive integer; and obtaining the $i^{th}$ video progress corresponding to the $i^{th}$ abscissa.

15. The electronic device of claim 12, the operations further comprising:

in response to a determination that a start playback condition is satisfied, playing the target video starting from the $i^{th}$ video frame of the $i^{th}$ video progress; or replaying the target video.

16. A non-transitory computer-readable storage medium, storing a computer program, the computer program, when executed by one or more processors of an electronic device, cause the one or more processors to perform operations comprising:

displaying a video playback area in a scrollable area, the video playback area being configured to display a target video;

detecting a first drag operation on the scrollable area;

moving the video playback area along a drag direction of the first drag operation;

displaying a first video frame of the target video at a first target video progress in the video playback area corresponding to a first position of the video playback area on the scrollable area according to an end of the first drag operation, the first position being associated with the first target video progress of the target video and the first target video progress of the target video does not exceed a threshold progress, wherein the threshold progress is based on a length of the target video or a video highlight clip of the target video;

detecting a second drag operation on the scrollable area following the first drag operation;

moving the video playback area further along the drag direction of the second drag operation;

displaying a second video frame of the target video at a second target video progress in the video playback area corresponding to a second position of the video playback area on the scrollable area according to an end of the second drag operation, the second position being associated with the second target video progress of the target video;

determining that the position of the video playback area on the scrollable area according to the second drag operation exceeding the threshold progress; and automatically playing the target video starting from the second video frame.

17. The non-transitory computer-readable storage medium device of claim 16, wherein a moving path of the video playback area according to the end of the first drag operation on the scrollable area comprises n positions, each of the n positions having a respective video progress, the target video progress comprises n video progresses corresponding to the n positions, and n is a positive integer, and the displaying a first video frame of the target video at a first target video progress in the video playback area further comprises:

in response to the video playback area moving to an $i^{th}$ position, determining an $i^{th}$ video progress according to the $i^{th}$ position, wherein i is a positive integer not greater than n; and displaying an $i^{th}$ video frame of the $i^{th}$ video progress of the target video in the video playback area.

18. The non-transitory computer-readable storage medium of claim 17, wherein the scrollable area is a vertical scrolling area; an ordinate of a position within the scrollable area has a corresponding video progress of the target video, the determining an $i^{th}$ video progress according to the $i^{th}$ position further comprises:

obtaining an $i^{th}$ ordinate corresponding to the $i^{th}$ position, wherein i is a positive integer not greater than n, and n is a positive integer; and obtaining the $i^{th}$ video progress corresponding to the $i^{th}$ ordinate.

19. The non-transitory computer-readable storage medium of claim 17, wherein the scrollable area is a lateral scrolling area, an abscissa of a position within the scrollable area has a corresponding video progress of the target video, and the determining an $i^{th}$ video progress according to the $i^{th}$ position further comprises:

obtaining an $i^{th}$ abscissa corresponding to the $i^{th}$ position, wherein i is a positive integer not greater than n, and n is a positive integer; and obtaining the $i^{th}$ video progress corresponding to the $i^{th}$ abscissa.

\* \* \* \* \*